US009550150B2

(12) United States Patent
Smirnov et al.

(10) Patent No.: US 9,550,150 B2
(45) Date of Patent: Jan. 24, 2017

(54) WATER PURIFICATION SYSTEM (75) Inventors: Sergey Victorovich Smirnov, St.Petersburg (RU); Vadim Nikolaevich Knizel, St.Petersburg (RU); Nikolay Yakovlevich Gorohov, St.Petersburg (RU); Joseph Lvovich Shmidt, New York, NY (US)

(73) Assignee: Electrophor, Inc., Woodmere, NY (US)

( * ) Notice: Subject to any disclaimer, the term of this patent is extended or adjusted under 35 U.S.C. 154(b) by 860 days.

(21) Appl. No.: 13/500,634

(22) PCT Filed: Sep. 8, 2010

(86) PCT No.: PCT/RU2010/000491
§ 371 (c)(1),
(2), (4) Date: Apr. 5, 2012

(87) PCT Pub. No.: WO2011/043692
PCT Pub. Date: Apr. 14, 2011

(65) Prior Publication Data
US 2012/0234739 A1    Sep. 20, 2012

(30) Foreign Application Priority Data

Oct. 5, 2009  (RU) ................. 2009137417

(51) Int. Cl.
*C02F 1/44*  (2006.01)
*B01D 61/10*  (2006.01)
(Continued)

(52) U.S. Cl.
CPC .............. *B01D 61/10* (2013.01); *C02F 1/441* (2013.01); *B01D 61/025* (2013.01); *B01D 61/12* (2013.01);
(Continued)

(58) Field of Classification Search
None
See application file for complete search history.

(56) References Cited

U.S. PATENT DOCUMENTS 3,887,463 A * 6/1975 Bray ............... B01D 61/12
                                              210/110
4,190,537 A * 2/1980 Tondreau .......... B01D 61/10
                                              137/544
(Continued)

OTHER PUBLICATIONS

G.M. Bartenev, S.Y. Frenkel, "Polymer Physics", L.: Chemistry, 1990.
(Continued)

Primary Examiner — Terry Cecil
(74) Attorney, Agent, or Firm — Hoffmann & Baron, LLP (57) ABSTRACT The inventions relate to purifying water and can be used in domestic water purification systems. The claimed filtered water storage unit for the storage device of a water purification system includes a housing, an elastic chamber for filtered water, and a region for pressurizing untreated water. The water purification system includes a reverse osmosis membrane, a clean water discharge pipe, an overflow into a drain, a clean water tap, and a storage device having a filtered water storage unit and a hydro-automatic unit. The outlet of the controlled chamber of a valve is associated with the water pressurizing region in the housing of the water storage unit, and the input of the controlling chamber of a valve is associated with the clean water discharge pipe upstream of the tap, wherein the valve for controlling water pressurization is normally open and the valve for controlling drainage is normally closed.

24 Claims, 5 Drawing Sheets a) the tap is closed (51) Int. Cl.
 *B01D 61/12* (2006.01)
 *B01D 61/02* (2006.01)
(52) U.S. Cl.
 CPC ....... *B01D 2313/18* (2013.01); *B01D 2313/50* (2013.01); *Y10T 137/85978* (2015.04)

(56) References Cited

U.S. PATENT DOCUMENTS

| | | | | |
|---|---|---|---|---|
| 4,579,242 A | * | 4/1986 | Ellis, III | B29C 65/0672 215/379 |
| 4,585,554 A | * | 4/1986 | Burrows | B01D 61/10 210/110 |
| 4,604,194 A | * | 8/1986 | Entingh | B01D 61/08 210/137 |
| 4,629,568 A | * | 12/1986 | Ellis, III | B01D 61/08 210/136 |
| 4,650,586 A | * | 3/1987 | Ellis, III | B01D 61/08 210/257.2 |
| 4,705,625 A | * | 11/1987 | Hart, Jr. | B01D 61/08 210/110 |
| 4,776,952 A | * | 10/1988 | Burrows | B01D 61/12 210/110 |
| 4,885,085 A | * | 12/1989 | Beall, Jr. | B01D 61/08 137/82 |
| 4,997,553 A | * | 3/1991 | Clack | B01D 61/10 210/257.2 |
| 5,006,234 A | * | 4/1991 | Menon | B01D 61/12 210/134 |
| 5,096,574 A | * | 3/1992 | Birdsong | B01D 61/08 210/195.2 |
| 5,096,577 A | * | 3/1992 | Ngo | C02F 3/06 210/151 |
| 5,122,265 A | * | 6/1992 | Mora | B01D 61/08 210/134 |
| 5,232,591 A | * | 8/1993 | Solomon | B01D 61/10 210/257.2 |
| 5,256,279 A | * | 10/1993 | Voznick | B01D 17/0214 200/61.2 |
| 5,358,635 A | * | 10/1994 | Frank | B01D 61/08 210/257.2 |
| 5,662,793 A | * | 9/1997 | Beall, Jr. | B01D 61/10 210/134 |
| 5,911,884 A | * | 6/1999 | Boulter | B01D 61/08 210/137 |
| 6,103,125 A | * | 8/2000 | Kuepper | B01D 61/025 210/137 |
| 6,110,360 A | * | 8/2000 | Hart, Jr. | B01D 61/08 210/110 |
| 6,764,595 B1 | * | 7/2004 | Halemba | B01D 61/08 137/590 |
| 7,316,774 B2 | * | 1/2008 | Halemba | B01D 61/08 210/106 |
| 7,550,084 B2 | * | 6/2009 | Schmitt | B01D 61/025 210/134 |

OTHER PUBLICATIONS

G.H. Briston, L.L. 5 Katan, "Polymer Films", M.: Chemistry, 1993.
V.E. Gul, V.N. Kuleznev, "Structure and Mechanical Properties of Polymers", M.: Publishing House "Labyrinth", 1994.

* cited by examiner

FIG. 1A a) the tap is closed

FIG. 1B b) the tap is open

FIG. 2A a) the tap is closed

FIG. 2B b) the tap is open

FIG. 3A (prior art)

a) the tap is closed

FIG. 3B (prior art)

b) the tap is open

WATER PURIFICATION SYSTEM

CROSS-REFERENCE TO RELATED APPLICATIONS

This application is a National Stage entry of International Application No. PCT/RU2010/000491, filed on Sep. 8, 2010, which claims priority to and the benefit of Russian Application No. 2009137417, filed on Oct. 5, 2009. The entire content of these prior applications is incorporated herein by reference.

BACKGROUND

The present inventions relate to the means for water treatment, preferably drinking water, and can be used in domestic water purification systems.

There is known a domestic reverse-osmosis system with a storage device for water that contains placed in the outer housing of the storage tank an elastic shell hermetically separating its cavity into two parts: the internal part changing cyclically its volume depending on the amount of purified water in it, and the outer part arranged between the shell and the housing of the storage tank, and also includes a control valve for water pumping into the outer chamber and control valve for water drain from the cavity to drainage.

In the prior art, there is known a number of U.S. patents (for example, U.S. Pat. Nos. 4,579,242; 4,585,554; 4,604,194; 4,629,568; 4,650,586; 4,705,625; 4,776,952; 4,885,085; 4,997,553; 5,662793, etc.) that describe water purification systems with storage devices for water including an air cavity.

At the same time, in water purification systems, there are used mechanical valves (for example, U.S. Pat. No. 4,997,553), piston type valves (for example, U.S. Pat. No. 3,887,463), and membrane type valves (for example, U.S. Pat. No. 4,190,537).

However, practical implementation of these devices is difficult since it requires a complex, highly reliable control system for water-to-water storage device.

There is known a water purification system using a device to accumulate purified filtered water, which is described in U.S. Pat. No. 6,764,595 published on 20 Jun. 2004, produced by Kinetico Incorporated, which is chosen as a prototype for the system and storage device.

Figure 3A:
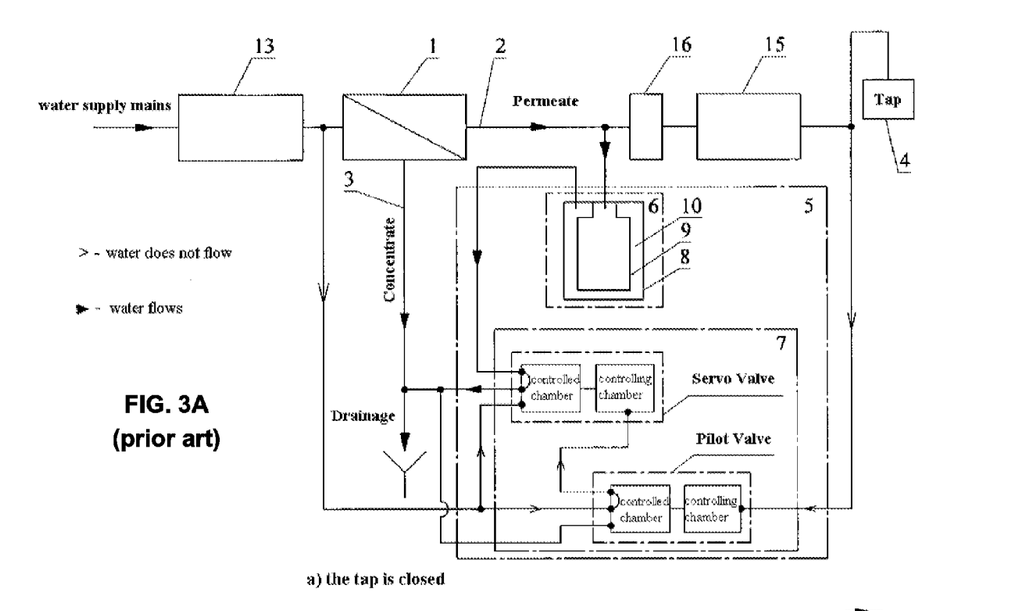
FIGS. 3A and 3B show a functional diagram of the water purification system of "Kinetico" Incorporated (prototype) in:
 a) state at closed clean water tap (FIG. 3A); and
 b) state at open clean water tap (FIG. 3B).
Figure 3B:
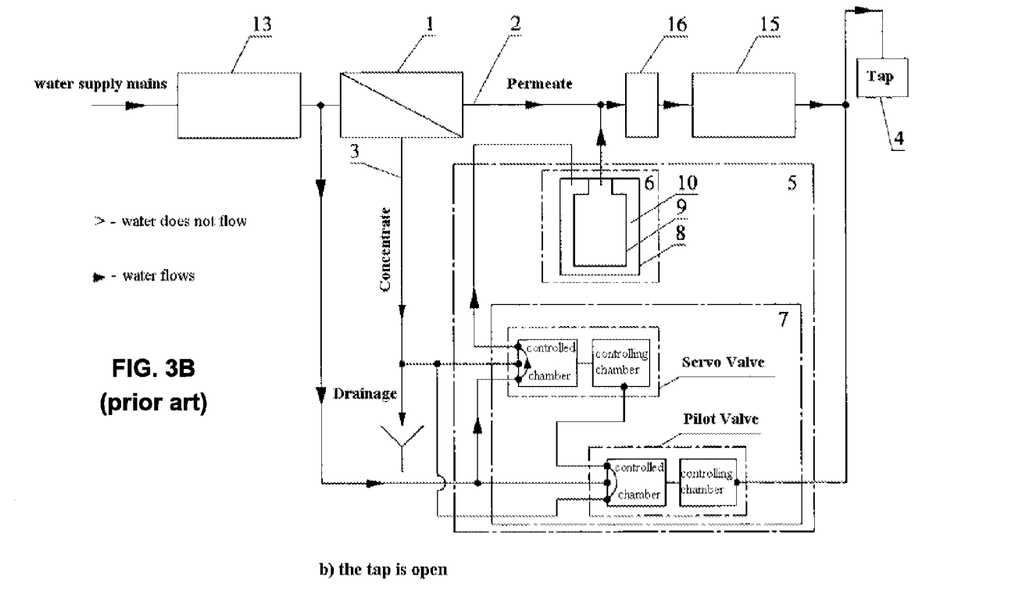

The system includes a reverse-osmosis membrane, storage tank and control unit (block diagram shown in FIGS. 3A and 3B). The storage tank of the known water purification system is equipped with an elastic shell arranged inside an external vessel of the tank, which shell is intended for purified water (leachate or permeate), and a pumping area formed in the space between the shell and the vessel housing. In the system of water purification, the input of reverse-osmosis membrane is intended to supply pressurized tap water, and the output of reverse-osmosis membrane coupled with the shell cavity of the storage tank is connected with the tap for clean water via an outlet pipe.

Another output of reverse-osmosis membrane is connected with the drainage where the water with filtered impurities (concentrate) is discharged. For managing water pumping into the storage tank and discharge of the concentrate into the drainage, the system is equipped with two control valves connected in series, one after the other. That is, the system control unit includes a water-pressure-sensitive automatic primary control valve for water pumping (Pilot Valve), which valve has a controlling chamber and a controlled chamber, as well as a slave valve (Servo Valve) for drainage control with a controlling chamber and a controlled chamber. The controlling chamber of the Pilot Valve is connected with a tap of clean water via an outlet pipe, and the input of the controlled chamber is connected with the pipe-line. In the drainage control valve, the input of the controlled chamber is connected to a pumping water zone in the storage tank, and the output of the controlled chamber is connected to the drainage.

The described system uses combined type valves, which valves are driven by control pressure through the chamber containing an elastic membrane, and their shifting is performed using a piston spool.

The large number of inputs-outputs for the valve of control unit, i.e., large number of points needed in sealing, evidences a high degree of risk of potential leaks in the system, which reduces the reliability of the system. At the same time, a large number of connections in the system, as well as the connecting scheme, in which the control valve for water pumping is not coupled directly to the storage tank, but only through the drainage control valve, allows to make a conclusion on the complexity of the water purification system control unit, which reduces reliability of the system.

In addition, the storage device has the stagnant zone, which transfers hydraulic pressure, but in which the water does not circulate. In these areas, bacteria and germs develop, penetrate in time the line of clean water, and deteriorate its quality.

Storage tanks for water treatment systems include flexible membranes (shells, cells) designed to separate objects of storage and accumulate intermediate objects.

There is a group of tank constructions with a membrane that has reduced comparatively with the overall dimensions a connecting part—the neck. Such membrane configuration greatly simplifies connection to the tank housing and organization of stream redirection, allows to reduce sealing part dimensions and therefore tensions in sealing elements. Further, the configuration with the neck provides a possibility to remove the membrane sealing zone from the area of connection of tank housing elements, or to use one-piece tank housing.

Using the construction of storage tank with an elastic membrane in the system of water purification is known, for example, from aforesaid U.S. Pat. No. 6,764,595 of Kinetico Incorporated.

Traditionally, similar membranes are manufactured using different methods. One method is direct or transfer (flow) molding of rubber compounds with subsequent removal of vulcanized products from a punch through a narrowed neck. Some types of rubbers have feature of high relative elongation, and also the punch cross section has figured shape, which allows to carry out the process of removal without damaging the product. The disadvantages of this method are energy intensity and duration of the product vulcanization process, and also the high complexity of the removing operation. Another method for obtaining membranes is pressure molding thermoplastic elastomer with subsequent removing a cooled product from punch through the neck. However, smaller in comparison with rubbers relative elongation of thermoplastic elastomers significantly complicates removing a product and the construction of a punch. Besides, pressure molding technology, which substantially reduces the cycle time, limits the thickness of the casting walls, and makes it difficult to obtain a membrane with a thickness of baseline minimum to perform its functions.

As a prototype, selected is a storage unit for filtered water described in U.S. Pat. No. 4,997,553 of 5 Mar. 1991, which storage unit includes a housing (of a tank) with an elastic shell inside performed of thermostatic elastomer and fixed to the housing using the neck that isolates hermetically the inner cavity intended for storing clean water from the volume formed between housing walls and shell walls intended for discharging process water.

During the operation, the membrane body is cyclically compressed and extended changing divided volumes, while the neck remains firmly fixed in the tank providing a seal. This gives rise to different requirements on mechanical properties of different parts of the membrane: the membrane body shall be more durable, flexible and wear-resistant, while the neck shall be more rigid. The prototype does not solve the aforesaid problem.

SUMMARY

The object of the group of claimed inventions is to provide a water purification system, as well as a device and units used in the system having high reliability and providing high water treatment quality.

The object is achieved by a filtered water storage unit for the storage device of the water purification systems, which includes a housing that has located in it an elastic chamber for filtered water, and a pumping zone formed by a space between the chamber walls and housing walls, wherein the elastic chamber is performed of thermoplastic elastomer and includes a monolithic neck rigidly fixed in the housing and the chamber body, wherein, according to the invention, the storage unit includes the chamber body performed of modified thermoplastic elastomer having biaxially oriented structure.

The elastic chamber (membrane) provided in the filtered water storage unit for the storage device of the water purification system hermetically separates the housing cavity into two parts: the internal part for filtered water, and the space between its walls and housing walls for pumping non-treated water thereinto. In operation, the elastic body of the chamber-membrane is cyclically compressed and expanded changing volumes separated by it, while the neck remains firmly fixed in the housing. The chamber body material has a biaxially oriented polymer structure obtained in the manufacturing process. The elastic chamber is produced by a two-stage blow forming method. At the first stage of blow forming the thermoplastic elastomer, a small sized work piece is obtained, in which the neck had been formed for the future chamber. In the second stage, the neck of the heated work piece is fixed, and the heated work piece is blown that extends the work piece to finite size. Thus, in the second stage, the neck material does not change, and the body material has been modified, wherein the temperature and strain rate are determined from the conditions of performing cold orientational crystallization. The aforesaid processes are described in the following sources: 1. G. M. Bartenev, S. Y. Frenkel, "Polymer Physics", L.: Chemistry, 1990; 2. G. H. Briston, L. L. Katan, "Polymer Films", M.: Chemistry, 1993; 3. V. E. Gul, V. N. Kuleznev, "Structure And Mechanical Properties Of Polymers", M.: Publishing House "Labyrinth", 1994.

Such a modification of the polymer supramolecular structure (hereinafter—SMS) results in reduced brittleness (increased impact strength), increased ductility, increased bending fatigue strength, hence, considerably increased resistance of the chamber to cyclic loads during operation. The presence of polymer oriented structure also increases barrier properties of the chamber walls and, thus, reduces likelihood of diffusion of chemicals through the chamber walls [1], [2], [3].

In particular embodiments, body walls of the chamber of the storage unit for filtered water are at least 20% thinner than walls of chamber neck; the body walls preferably have a thickness between 0.1 mm to 5 mm, most preferably 0.3 mm to 2 mm. All figures are obtained experimentally. The SMS modification of the chamber body material allows to have a smaller body wall thickness as compared with the wall thickness of the chamber neck. This provides the chamber body with more flexibility, while the chamber neck being thickened ensures fixture rigidity and a hermetic seal in the housing. The neck rigidity promotes flow arrangement inside the storage unit for filtered water that does not allow a flexible chamber body to close input and output openings. Reducing the wall thickness of the chamber body also reduces the weight of the product.

In the particular case of implementation, the body walls of the chamber of the storage unit for filtered water are performed of thermoplastic with biaxially oriented structure preferably selected from the group of thermoplastic polyolefin elastomers or styrene elastomers. Such choice is determined experimentally as the optimum material to use for the described purposes. A thermoplastic elastomer can be used as a particular material for the chamber, for example, Dryflex 600 601 (produced by Nolato Elastotechnic).

Therefore, application of the described above construction improves the chamber resistance to cyclic loads during operation, reduces the weight of a product, and improves barrier properties of the chamber. This, in turn, leads to higher reliability and higher quality of water purification.

The object of the invention is also achieved due to the fact that, in the first embodiment, the storage device of the system for water purification includes the storage unit for filtered water and a hydroautomatic unit, wherein the storage unit for filtered water is a housing with the elastic chamber for filtered water positioned inside, and the pumping zone formed by space between the chamber walls and the housing for non-treated (pipe-line) water, and the hydroautomatic unit has a sensitivity to water pressure automatic control valve that controls water pressure in the pumping zone in the body of the storage unit for filtered water equipped with a controlling chamber and a controlled chamber, and an automatic control valve for controlling drainage equipped with a controlling chamber and a controlled chamber, wherein the controlling chamber input of the control valve for water pumping is designed to connect to the pipeline for purified water, the controlled chamber input of this control valve is designed to connect to the water supply, the controlled chamber input of the drainage control valve is connected to the water-pumping zone in the housing of the filtered water storage unit, and its output is designed to connect with drainage, wherein, according to the invention, the controlled chamber output of the pumping water control valve is connected to the water-pumping zone in the housing of the filtered water storage unit, and the controlling chamber input of the drainage control valve is designed to connect to the clean water pipeline, and wherein the water pumping control valve is normally open, and the drainage control valve is normally closed.

In the storage device described in the prototype (U.S. Pat. No. 6,764,595 of Kinetico Incorporated), the hydroautomatic unit operates as follows. When the clean water pipeline pressure increases (when the clean water tap is closed), control (primary) valve (Pilot Valve) comes into the state, in which the slave valve (Servo Valve) is open for connection to the drainage, so water flows through the slave valve, from the pumping zone in the filtered water storage unit housing into the drainage, non-purified water pressure applied to the elastic chamber walls of the storage unit is reduced, and the elastic chamber is filled with purified filtered water. If the clean water tap is open, pressure in the clean water pipeline decreases, the control (primary) valve (Pilot Valve) changes its state so that the slave valve (Servo Valve) is closed for connection to the drainage and is open for connection to the water supply line, which results in that the pipeline water, via the slave valve, enters the storage unit pumping zone, making pressure applied to the elastic chamber walls and pressing out therefrom filtered water into the clean water pipeline.

Thus, in the prototype, automatic valves of the hydroautomatic unit are connected to the filtered water storage unit in sequence, i.e., when the clean water pipeline pressure changes, at first the control (primary) valve (Pilot Valve) changes its state, and then, due to the series connection of the controlled chamber output of the primary valve to the controlling chamber input of the slave valve, there is changed the status of the the second valve connected to the pumping water zone in the storage unit housing.

In the proposed storage device, according to the first embodiment of the present invention, the hydroautomatic unit operates as follows. When the clean water tap is closed (raised pressure in the clean water pipeline), the pumping control valve is closed, and the drainage control valve is open, which results in that untreated water flows from the pumping zone of the storage unit into the drainage via the drainage control valve, the water pressure applied by the untreated water to elastic chamber walls in the storage unit is reduced, and the elastic chamber is filled with purified filtered water. If the clean water tap is open, pressure in the clean water pipeline drops, the pumping control valve opens, and the drainage control valve is closed, resulting in that the supply line water flows through the pumping control valve, enters the pumping zone of the storage unit, exerts pressure applied to elastic chamber walls, and pushes out filtered water therefrom into the clean water line.

Thus, in the proposed storage device, controlling chamber inputs of both automatic valves (the pumping control valve and the drainage control valve) are designed to connect to the clean water pipeline, and the controlled chamber outputs of these valves are connected to the water pumping zone in the housing of the filtered water storage unit. Thus, it may be said that the automatic pumping control valve and automatic drainage control valve are connected in parallel to the water pumping zone in the housing storage unit for filtered water.

At series connection of automatic valves of the hydroautomatic unit with the filtered water storage unit in the storage device of the prototype, there are stagnant, so-called "dead" zones, which transfer hydraulic pressure, but do not allow water to circulate, namely:

connection of the clean water pipeline with the controlling chamber input of the control (primary) valve (Pilot Valve) (the water pumping and drainage control valves, in the proposed solution);

connection of the controlled chamber input of the of the control (primary) valve (Pilot Valve) (the water pumping control valve, in the proposed solution) from the tapping point of this connection to one of controlled chamber inputs of the slave valve (Servo Valve) (drainage control valve, in the proposed solution);

connection of one of controlled chamber outputs of the control (primary) valve (Pilot Valve) (the water pumping control valve, in the proposed solution) to the controlling chamber input of the slave valve (Servo Valve) (drainage control valve, in the proposed solution)—this connection is absent in the inventive solution; and connection of one of controlled chamber outputs of the control (primary) valve (Pilot Valve) (the water pumping control valve, in the proposed solution)—this connection is absent in the inventive solution.

In these areas, there develop bacteria and microbes which penetrate with time in the clean water pipeline and deteriorate its quality. In the claimed device performed according to the first embodiment, all of the specified dead zones, except the first dead zone, are absent, which results in improvement of the quality of filtered water.

The proposed storage device circuit allows to use, as automatic valves of the hydroautomatic unit, different design valves in comparison with valves used in the prototype. In the prototype, there are used spool type valves, in which purified filtered water (permeate) and untreated (supplied) water are separated by only a thin membrane, in case of violation of which the microbes from the supplied water can get into the filtered water. The claimed device uses automatic valves with elastic membrane, in which there is an air cavity (coupled with the atmosphere) between filtered water and supplied water, which prevents ingress of microbes into the filtered water and in the clean water tap in case of possible damage of the membrane.

In addition, for implementation of the proposed storage device, as automatic valves of the hydroautomatic unit, there are used valves with one input and one output of the controlled chamber, in comparison with controlled chamber valves with three inputs and three outputs in the prototype, which reduces the number of compounds in the inventive device, simplifies its design, and increases device reliability.

The aforesaid object is achieved also due to the fact that in the second embodiment, the storage device of the water purification system includes a filtered water unit storage and hydroautomatic unit, wherein the filtered water storage unit is a housing containing inside the elastic chamber for filtered water and a non-treated (supplied) water pumping zone formed by space between chamber walls and the housing, and the hydroautomatic unit has the water pressure sensitive automatic valve for controlling pumping water in the pumping zone in the filtered water storage unit housing with the controlling and controlled chambers, and a drainage automatic control valve having controlling and controlled chambers, wherein, according to the invention, the water pumping control valve in the pumping zone in the filtered water storage unit housing and the drainage control valve are combined constructively together and have a single controlling chamber, wherein the controlling chamber input and output are designed to connect to the clean water pipeline, the controlled chambers of the pumping control valve and the drainage control valve are connected to the controlling chamber in parallel, and wherein the water pumping control valve normally is open, and the drainage control valve normally is closed, and wherein the controlled chamber input of the water pumping control valve is designed to connect to the water supply, and the output is connected to the pumping zone in the filtered water storage unit housing, and the controlled chamber input of the drainage control valve is connected to the pumping zone in the filtered water storage unit housing, and the output is intended to connect with drainage.

In the storage device described in the prototype (U.S. Pat. No. 6,764,595 of Kinetico Incorporated), the hydroautomatic unit operates as described above (first embodiment).

In the claimed storage device, according to second embodiment, the hydroautomatic unit operates as follows. If the clean water tap is closed, pressure in the clean water line is increased, which causes a reaction of the controlling chamber that is common to both automatic valves, in which input and output are designed to connect to the clean water line, wherein the water pumping control valve is set to closed position, and the drainage control valve is set to open position, resulting in that untreated water from the storage unit pumping zone is discarded into the drainage, pressure of unpurified water applied to the storage unit elastic chamber walls is reduced, and the elastic chamber is filled with filtered water. If the clean water tap is open, water pressure in the clean water pipeline drops, the pumping control valve opens, and the drainage control valve closes, resulting in that supplied water enters the storage unit pumping zone via the water pumping control valve, exerts pressure on the elastic chamber walls and presses out therefrom filtered water into the clean water pipeline.

That is, in the claimed storage device implemented according second embodiment, when the input and output of the controlling chamber being common to both automatic valves (the pumping control valve and the drainage control valve) are designed to connect to the clean water pipeline, and the controlled chamber outputs of both valves are connected to the water pumping zone in the filtered water storage unit housing, then the automatic water pumping control valve and the automatic drainage control valve are connected in parallel to the water pumping zone in the filtered water storage unit housing.

Thus, in the storage device performed according to second embodiment, two independent controlling chambers of automatic valves are replaced with one, which simplifies the scheme, reduces the number of water connections, and thus reduces the risk of external leakage. At the same time, the cost of manufacturing the device decreases due to reducing the number of places requiring sealing.

In the case of the storage device implementation according to the second embodiment, as in the first embodiment, the controlling chamber is separated from each of the controlled chambers by the air cavity connected with the atmosphere, which makes it impossible for water to stream from one cavity into another, thus avoiding, in a case of damage of the membrane, untreated water (including bacteria and viruses) from getting into purified water for users.

In addition, in the storage device implemented according to the second embodiment, there are no dead zones (places, in which water does not flow), listed in the description of the storage device according to the first embodiment, including the dead zone, that remains in the device according to the first embodiment, namely, the point of connection of the clean water pipeline with a common controlling chamber of hydro unit valves (the control (primary) valve (Pilot Valve), in the prototype). That is, in the proposed storage device implemented according to the second embodiment, there are absent "dead" zones, which leads to further improvement of the quality of filtered water.

In particular embodiments of the storage device for the water purification system implemented according to both the first and the second embodiments, the filtered water storage unit chamber body walls are performed of thermoplastic with biaxially-oriented structure.

As mentioned above, using as a chamber body material, a modified polymer with biaxially-oriented structure, obtained in the manufacturing process, results in reduced fragility, increased ductility, increased bending fatigue strength, and, therefore, increased resistance of the chamber to cyclic loads during operation. The presence of oriented structure in the polymer also increases the barrier properties of the chamber walls and, therefore, reduces a risk of diffusion of chemicals through the chamber walls.

In particular embodiments of the storage device for the water purification system, implemented according to both the first and the second embodiments, the filtered water storage unit chamber body walls performed of thermoplastic with biaxially-oriented structure are preferably selected from the group of thermoplastic polyolefin elastomers or thermoplastic styrene elastomers. As mentioned above, such choice has been determined experimentally as the best material to use for those purposes.

In particular embodiments of the storage device for the water purification system implemented according to both the first and the second embodiments, the filtered water storage unit chamber body walls are at least 20% thinner than the walls of the chamber neck; the body walls preferably have thickness from 0.1 mm to 5 mm, most preferably 0.3 mm to 2 mm. As mentioned above, all numerical values are obtained experimentally and are optimal for this purpose.

Comparative analysis of the storage device implemented according to both the first and the second embodiments in relation of the prototype shows that the proposed technical solution differs from the prototype and achieves the aforesaid object.

The aforesaid object is also achieved in that, according to the first embodiment, the water purification system includes a reverse osmosis membrane, a clean water outlet pipe, a drain for the water with impurities, a clean water tap, and the storage device, which includes a storage unit for storing filtered water and a hydroautomatic unit;

wherein the filtered water storage unit includes: a housing in which there is located an elastic chamber for filtered water and an untreated (supplied) water pumping zone formed by a space between the chamber walls and the housing walls; and the hydroautomatic unit includes: a water pressure sensitive automatic control valve for control of water pumping in the pumping zone, which automatic control valve is located in the housing of the filtered water storage unit and has a controlling chamber and a controlled chamber, and a drainage automatic control valve has a controlling chamber and a controlled chamber;

wherein the reverse osmosis membrane input is connected to a pressurized water supply pipeline, the purified water (permeate) output of the reverse osmosis membrane is connected, by the outlet pipe, with the clean water tap and an elastic chamber inside the cavity in the filtered water storage unit housing, the reverse osmosis membrane output with water including filtered impurities (concentrate) is connected to drainage by a drain pipe, the controlling chamber of the water pumping control valve is connected to the outlet pipe for treated water, the controlled chamber input of the water pumping control valve is connected to the water supply, the controlled chamber input of the drainage control valve is connected to the water pumping zone in the filtered water storage unit housing, and output of the drainage control valve is connected to the drainage;

wherein, according to the invention, the controlled chamber output of the water pumping control valve is connected to the water pumping zone in the filtered water storage unit housing, and the controlling chamber input of the drainage control valve is connected to the clean water outlet pipe upstream of the tap, wherein the water pumping control valve is normally open, and the drainage control valve is normally closed.

The aforesaid object is also achieved in that, according to the second embodiment, the water purification system includes a reverse osmosis membrane, a clean water outlet pipe, a drainage for water with impurities, a clean water tap, and a storage device that includes a filtered water storage unit and a hydroautomatic unit, wherein the filtered water storage unit includes: a housing in which there is located an elastic chamber for filtered water and an untreated (supplied) water pumping zone formed by a space between the chamber walls and the housing walls; and the hydroautomatic unit includes: a water pressure sensitive automatic control valve for control of water pumping in the pumping zone, which automatic control valve is located in the housing of the filtered water storage unit and has a controlling chamber and a controlled chamber, and a drainage automatic control valve having a controlling chamber and a controlled chamber;

wherein the reverse osmosis membrane input is connected to a pressurized water supply pipeline, the purified water (permeate) output of the reverse osmosis membrane is connected, by the outlet pipe, with the clean water tap and an elastic chamber inside cavity in the filtered water storage unit housing, the reverse osmosis membrane output with water comprising filtered impurities (concentrate) is connected to drainage by a drain pipe, wherein, according to the invention, the water pumping control valve in the pumping zone in the housing of filtered water storage unit and the drainage control valve are constructively combined together and have a single common controlling chamber, wherein the controlling chamber input and output are connected to the line of purified water outlet pipe upstream of the clean water tap, controlled chambers of the water pumping control valve and the drainage control valve are connected to the controlling chamber in parallel, wherein the water pumping control valve is normally open, and the drainage control valve is normally closed, at the same time, the controlled chamber input of the water pumping control valve is connected to the water supply, and the controlled chamber output is connected to the pumping zone in the filtered water storage unit housing, the controlled chamber input of the drainage control valve is connected to the pumping zone in the filtered water storage unit housing, and its output is connected to the drainage.

Thus, the proposed water purification system implemented, according to the first and second embodiments, is the reverse osmosis system having the storage device including the clean water storage unit and the control unit. At the same time, in the water purification system implemented according to the first embodiment, there is used the above-described storage device performed according to the first embodiment, and in the water purification system implemented according to the second embodiment, there isused the above-described storage device performed according to the second embodiment.

In this connection, the proposed water purification system implemented according to the first and second embodiments, has all of the above-indicated benefits and advantages as compared with the system described in the prior art, which results in simplification of the device, increasing the reliability of its operation and raising quality of filtered water intended for use by consumers.

In particular implementations according to both the first and second embodiments, the water purification system further includes a prefilter, placed upstream of the reverse osmosis membrane. The prefilter has one or more filters for prepurifying supplied water and removing from the supplied water mechanical particles (e.g., sand) and/or chemical compounds (e.g., chlorine), which destroy the membrane. Therefore, the prefilter improves water filtration quality and increases operating life of the reverse osmosis membrane, i.e., increases the life of the system as a whole.

In particular implementations according to both the first and second embodiments, the water purification system further includes a shut-off hydraulically operated valve installed upstream of the reverse osmosis membrane and connected to the purified water outlet pipe.

The shut-off valve closes the water flow to the reverse osmosis membrane in the case, if there is no water discharge in the clean water pipeline, and the water storage unit elastic chamber of the storage device is entirely filled with water, because otherwise untreated water passes through the membrane and is discharged to the drainage. That is, the shut-off hydraulically operated valve protects the reverse osmosis membrane from excessive usage in these cases, increases its service life, increases water filtration quality, and increases the operational life and water saving of the water purification system.

In particular implementations according to both the first and second embodiments, the water purification system further includes a check valve, which is installed in the purified water (permeate) pipeline upstream of the hydro unit.

Additional installation of the check valve in the water treatment system protects the hydro unit valves against false triggering, when the pressure drops in the filled chamber of the filtered water storage unit. This, in turn, protects the system against excessive consumption of water poured in the drainage, which increases the service life of the membrane, improves water filtration quality, and increases life of the whole system.

In particular implementations according to both the first and second embodiments, the water purification system further includes a postfilter installed in the clean water pipeline (permeate) upstream of the tap.

Additional installation of the postfilter allows to finally prepare water for use by a consumer (for example, remove off-odors, saturate water with certain minerals), and improves the system operation quality.

In particular implementations according to both the first and second embodiments, the chamber body of the filtered water storage unit in the water purification system is performed of modified thermoplastic elastomer with biaxially oriented structure, which, in particular, is preferably selected from the group of thermoplastic polyolefin elastomers or thermoplastic styrene elastomers.

In this case, in particular, the chamber body walls of the filtered water storage unit are at least 20% thinner than the walls of the chamber neck.

Thus, in particular, the chamber body walls preferably have a thickness of 0.1 mm to 5 mm, most preferably 0.3 mm to 2 mm.

Since the proposed water purification system implemented according to both the first and second embodiments includes a reverse osmosis system with a clean water storage device including a water storage unit and a control unit, in this system, in all particular cases of its implementation, there is used the filtered water storage unit described above, embodied in particular different cases as described above, the use of which allows to obtain additional benefits that were specified at describing the filtered water storage unit in general and special cases.

Therefore, the proposed water purification system implemented according to both the first and second embodiments has all of the above-indicated benefits and advantages as compared with the system described in the prior art, which results in improving the quality of filtered water and increasing the reliability of the whole system.

BRIEF DESCRIPTION OF THE DRAWINGS

The proposed group of inventions entitled as "Filtered water storage unit for a storage device of a water purification system, the storage device of the water purification systems (embodiments), the water purification system (embodiments)" are illustrated by the following drawings.

DETAILED DESCRIPTION

The proposed water purification system in the general case of implementation performed according to the first embodiment with use of the proposed storage device performed according to the first embodiment and also the proposed storage unit for filtered water (FIGS. 1A and 1B) includes the reverse osmosis membrane 1, the outlet pipe 2 of the clean water pipeline, a drainage 3, a clean water tap 4, and a storage device 5 including a filtered water storage unit 6 and a hydroautomatic unit 7,
wherein the filtered water storage unit 6 has a housing 8 in which there is located an elastic chamber 9 for filtered water and a pumping zone 10 for untreated (supplied) water, which zone is created by space between the chamber walls and the housing walls, and the hydroautomatic unit 7 includes a water pressure-sensitive automatic control valve 11 for water pumping control in the housing 8 of the filtered water storage unit 6 with a controlling chamber and controlled chamber, and automatic control valve 12 for drainage control with a controlling chamber and controlled chamber,
wherein the water pumping control valve 11 normally is open, and the drainage control valve 12 normally is closed, the input of the reverse-osmosis membrane 1 is connected to the pressurized water supply, the output of the reverse-osmosis membrane 1 with the purified water (permeate) is connected with the clean water tap 4 via the outlet pipe 2 and with the inner cavity of the elastic chamber 9 in the housing 8 of the filtered water storage unit 6, and the output of the reverse-osmosis membrane 1 with water including filtered impurities (concentrate) is connected to the drainage 3.

Figure 1A:
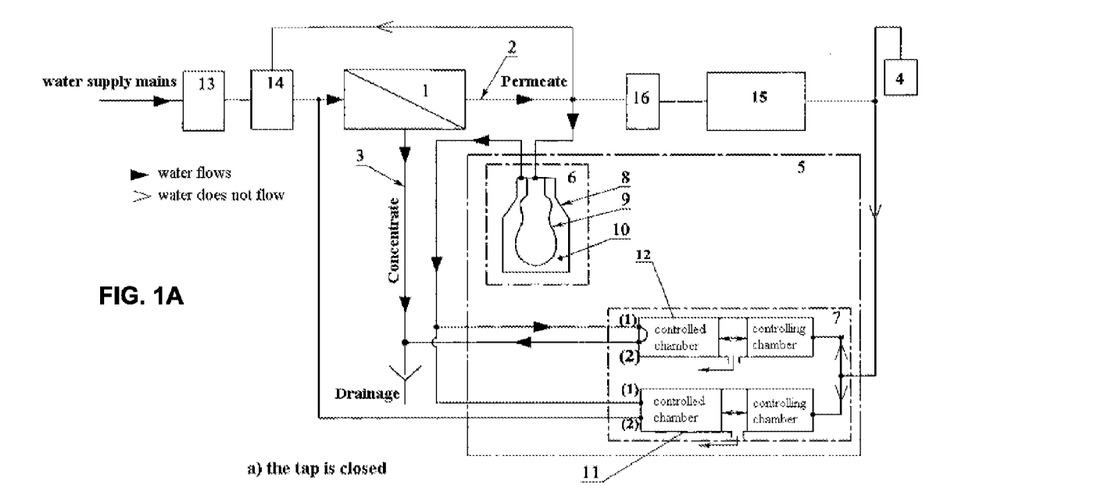
FIGS. 1A and 1B show a functional diagram of the water purification system according to the first embodiment with using the storage device according to the first embodiment, and the filtered water storage unit in:
 a) state at closed clean water tap (FIG. 1A); and
 b) state at open clean water tap (FIG. 1B).
Figure 1B:
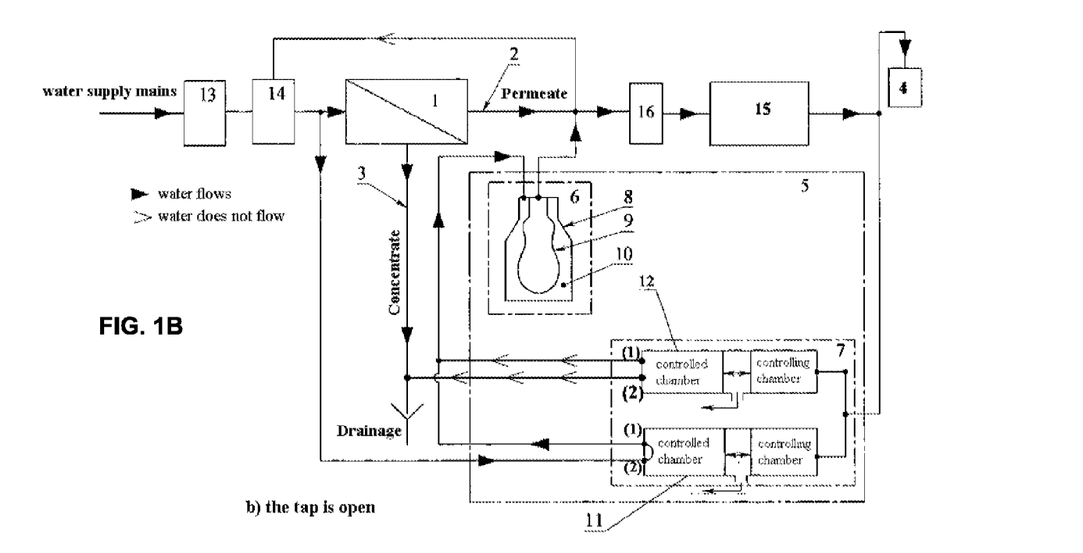

At the same time, the controlling chamber of the water pumping control valve 11 is connected to the outlet pipe 2 for purified water, the controlled chamber input of the valve 11 is connected to the water supply, the controlled chamber input of the drainage control valve 12 is connected to the water pumping zone 10 in the housing 8 of the filtered water storage unit 6, and its output is connected to the drainage 3; the controlled chamber output of the water pumping control valve 11 is connected to the water pumping zone 10 in the housing 8 of the filtered water storage unit 6, and the input of the controlling chamber of the drainage valve control 12 is connected to the purified water outlet pipe 2 upstream of the tap 4.

Figure 2A:
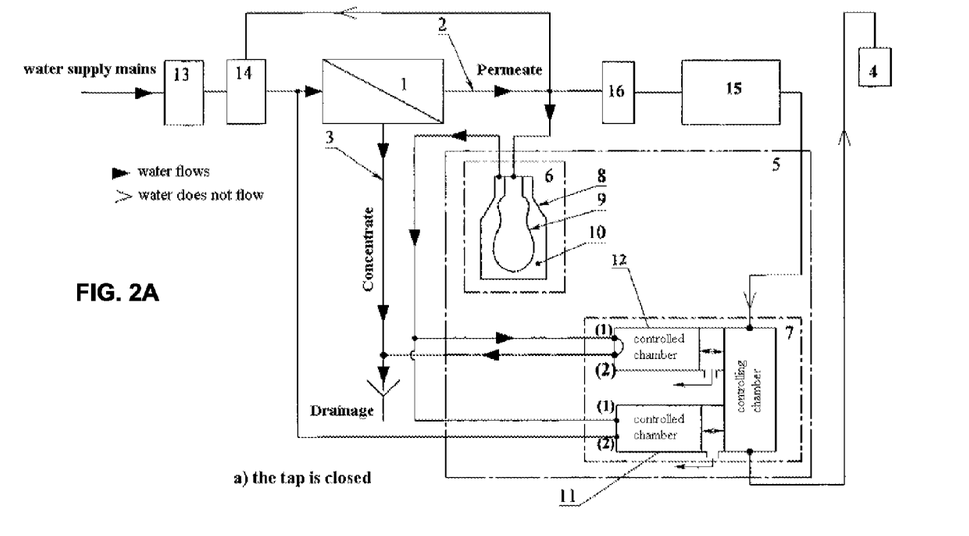
FIGS. 2A and 2B show a functional diagram of the water purification system according to the second embodiment with using the storage device according to the second embodiment, and the filtered water storage unit in:
 a) state at closed clean water tap (FIG. 2A); and
 b) state at open clean water tap (FIG. 2B).
Figure 2B:
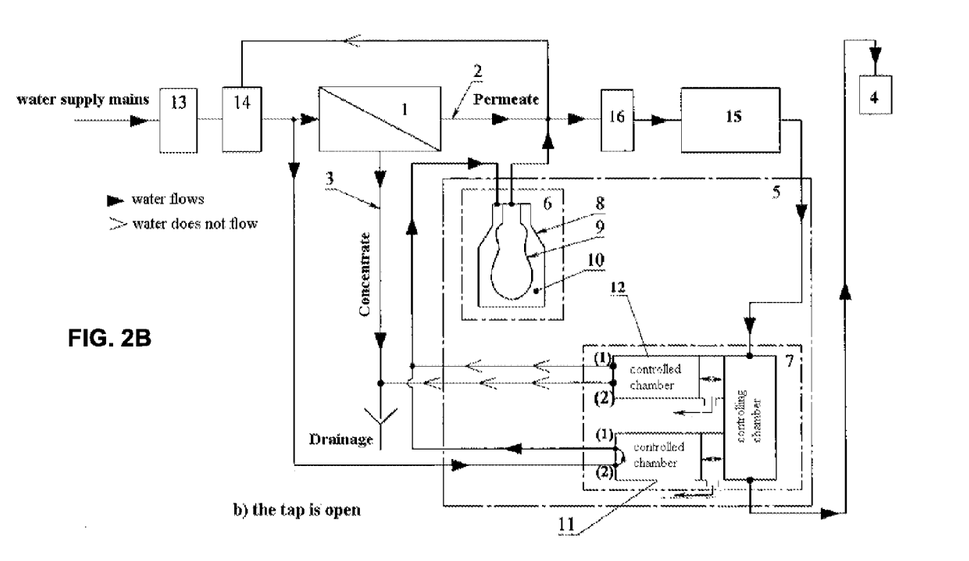

The proposed water purification system in the general case of implementation according to the second embodiment with use of the proposed storage device implemented according to the second embodiment, and also the proposed storage unit for filtered water (FIG. 2) includes the reverse osmosis membrane 1, the outlet pipe 2 of the clean water pipeline, the drainage 3, the clean water tap 4 and the storage device 5 including the filtered water storage unit 6 and hydroautomatic unit 7,
wherein the filtered water storage unit 6 includes the housing 8 in which there is located the elastic chamber 9 for filtered water and the pumping zone 10 for untreated (supplied) water, which pumping zone is created by space between the chamber walls and the housing walls, and the hydroautomatic unit 7 includes the water pressure-sensitive automatic control valve 11 for water pumping control in the housing 8 of the filtered water storage unit 6 with the controlling chamber and the controlled chamber, and the automatic control valve 12 for drainage control with the controlling chamber and the controlled chamber,
wherein the input of the reverse-osmosis membrane 1 is connected to the pressurized water supply, the output of the reverse-osmosis membrane 1 with the purified water (permeate) is connected with the clean water tap 4 via the outlet pipe 2 and with the inner cavity of the elastic chamber 9 in the housing 8 of the filtered water storage unit 6, and the output of the reverse-osmosis membrane 1 with water including filtered impurities (concentrate) is connected to the drainage 3.

At the same time, the water pumping control valve 11 in the pumping zone 10 in the housing 8 of the filtered water storage unit 6 and the drainage control valve 12 are constructively combined together and have the single common controlling chamber, which by its input and output is connected to the outlet pipe 2 (permeate) upstream of the clean water tap 4, controlled chambers of the water pumping control valve 11 and the drainage control valve 12 are connected to the controlling chamber in parallel,
wherein the water pumping control valve 11 normally is open, and the drainage control valve 12 normally is closed, and wherein the input of the controlled chamber of the water pumping control valve 11 is connected to the water supply pipeline, and the output of the controlled chamber of the water pumping control valve 11 is connected to the pumping zone 10 in the housing 8 of the filtered water storage unit 6, the input of the controlled chamber of the drainage control valve 12 is connected to the pumping zone 10 in the housing 8 of the filtered water storage unit 6, and its output is connected to the drainage.

In particular cases of implementing the water purification system according to both the first and second embodiments, the system further includes the prefilter 13 installed upstream of the reverse osmosis membrane 1.

In particular cases of implementing the water purification system according to both the first and second embodiments, the system further includes a shut-off hydraulically operated valve 14 placed upstream of the reverse osmosis membrane 1 and connected to the filtered water outlet pipe 2.

In particular cases of implementing the water purification system according to both the first and second embodiments, the system further includes the postfilter 15 installed in the purified water (permeate) line upstream of the tap 4.

In particular cases of implementing the water purification system according to both the first and second embodiments, the system further includes the check valve 16 installed in the purified water (permeate) line upstream of the hydroautomatic unit 7.

In particular cases of implementing the water purification system according to both the first and second embodiments with use of the proposed storage device implemented according to both the first and second embodiments, and also the proposed filtered water storage unit (FIGS. 1A and 1B, FIGS. 2A and 2B), when the body of the elastic chamber 9 of the filtered water unit storage 6 is performed of modified thermoplastic elastomer with biaxially-oriented structure, in particular selected preferably from the group of thermoplastic polyolefin elastomers or thermoplastic styrene elastomers, and also in other particular cases, in which walls of the body of the chamber 9 of the filtered water storage unit 6 are at least 20% thinner than the walls of the neck of the chamber 9, or preferably have a thickness of 0.1 mm to 5 mm, most preferably 0.3 mm to 2 mm, their units and elements are the same as in the general case of their implementation.

The proposed water purification system in the general case of implementation according to the first embodiment, with use of the proposed storage device implemented according to the first embodiment, and also the proposed filtered water storage unit (FIGS. 1A and 1B), is operated as follows.

Initially, the system is not connected to the water supply under high pressure—water supply pipeline, i.e., the inlet valve (is not shown in the drawing) is closed; there is no water in the elastic chamber 9 of the filtered water storage unit 6 of the storage device 5, the drainage automatic control valve 12 is in the "closed" position, the position of the water pumping control valve 11 does not matter, and the pure water tap 4 is open.

At the first turn on of the system, i.e., at its connection to the water supply, the inlet valve (not shown) opens. Since the clean water tap 4 is opened, the pressure in the cavity of the elastic chamber 9 of the filtered water storage unit 6 in the storage device 5 is a little more than zero (0 bar). And since the pressure drop across the reverse osmosis membrane (ROM) 1 is nearest to zero, the pressure upstream of the ROM is determined by the pressure in the cavity of the elastic chamber 9, and is also slightly different from zero. Since, in this case, the ROM represents a significant hydraulic resistance, water does not pass through the ROM and does not enter the cavity of the elastic chamber 9 of the filtered water storage unit 6 of the storage device 5, and the water from the supply main pipeline enters the controlled chamber of the water pumping control valve 11.

In the cavity of the controlled chamber of the automatic valve 11, water exerts pressure on the elastic membrane, which hermetically separates it from the cavity connected to the atmosphere; the membrane, in turn, exerts pressure on the end of the rod of the automatic valve 11, and since in the control cavity, this time, there is no pressure (the clean water tap 4 is open), then the pressure is not exerted on the end of the rod from the side of the cavity, which results in displacement of the rod, i.e., the water pumping automatic control valve 11 opens and allows water to flow through it into the water pumping zone 10 of the water storage unit 6 of the storage device 5. The supplied water entering into the pumping zone 10 puts pressure on walls of the easily deformable elastic chamber 9, thereby compressing it and pushing out the technical air, which goes into the atmosphere through the open clean water tap 4.

This happens as long as the water entering the pumping zone 10 of the water storage unit 6 of the storage device 5 fills the volume available to it in the housing 8.

Once this occurs, the pressure in the pumping zone 10 starts to increase up to a value slightly lower than the pressure in the main water supply pipeline, after which the flow of water in the pumping zone 10 is terminated. As a result, the pressure at the point upstream of the ROM 1 increases almost up to the pressure in the main water supply, and the water flows to the input of the ROM. Passing through the ROM, the water is split into two streams: the first stream is filtered and purified demineralized water (permeate), which from the output of the ROM enters to the clean water pipeline via the outlet pipe 2, and the second stream is water containing filtered impurities including salt (concentrate), which goes to the drainage 3. Since at the same time, the supplied water continues to put pressure on the walls of the elastic chamber 9 of the filtered water storage unit 6 of the storage device 5, the purified water cannot get into the cavity of the elastic chamber 9 and, instead, enters the open clean water tap 4 and freely flows from the clean water tap 4.

At this moment, the clean water tap 4 is closed, discharge of purified water (permeate) through the tap stops, leading to increased pressure in the clean water pipeline within the system. In this case, the stem of the water pumping automatic control valve 11 begins to move in the direction of the controlled chamber as long as this will block the water supply out of it, as a result of which, there is terminated water supply from the water mains into the pumping zone 10 of the filtered water storage unit 6 of the storage device 5. Simultaneously, the stem of the drainage automatic control valve 12 begins to move toward the controlled cavity until it stops and opens, resulting in that the untreated water from the water pumping zone 10 of the filtered water storage unit 6 is merged into the drainage via the valve 12, the pressure of untreated water on the wall of the elastic chamber 9 in the storage unit 6 is reduced, and the elastic chamber 9 is filled with purified water.

The process continues until the easily deformable elastic chamber 9 takes up the whole volume available for it in the housing 8 of the filtered water storage unit 6 of the storage device 5.

After completely filling the elastic chamber 9 with purified water, the pressure in the clean water pipeline starts to increase, water supply to the input of the ROM 1 is terminated. The pressure at the point upstream of the ROM 1 increases almost to the pressure in the water mains, and water flows to the input of the ROM 1, i.e., the system takes its initial position.

When the clean water tap 4 is opened, pressure drops in the clean water pipeline, the drainage automatic control valve 12 is closed and terminates the flow of unpurified water from the water pumping zone 10 of the filtered water storage unit 6 in the storage device 5 to the drainage, and the water pumping automatic control valve 11 is opened, as a result of which supplied water begins to flow through the valve 11 into the pumping zone 10 of the filtered water storage unit 6 in the storage device 5, creating there pressure applied to walls of the elastic chamber 9 and pressing out therefrom purified water (permeate) into the clean water pipeline, which purified water flows to the input of the clean water tap 4 and flows out from its spout.

At closing the clean water tap 4, pressure in the clean water line increases forcing the pumping automatic control valve 11 to close, stopping the flow of untreated water into the pumping zone 10 of the filtered water storage unit 6 in the storage device 5, and the drainage automatic control valve 12 is opened resulting in that non-treated water from the pumping zone of the water storage unit is drained off into the drainage through the valve 12, the pressure of supplied water applied to the walls of the elastic chamber 9 in the storage unit 6 is reduced, elastic chamber 9 is filled with purified filtered water.

Thus, in case of purified filtered water is required, the user then opens and closes the valve 4, and processes described above are repeated.

From the description of the proposed water purification system implemented according to the first embodiment with use of the proposed storage device according to the first embodiment, it follows that because of parallel connection of the water pumping automatic control valve 11 and the drainage automatic control valve 12 with the water pumping zone 10 in the housing 8 of the filtered water storage unit 6 in the storage device 5, in the system compared to the prototype, there are no stagnant zones, in which there is no flow of water, except one (points of connection of the clean water pipeline with inputs of controlling chambers of automatic control valves 11 and 12), in which the bacteria and microbes are developed and penetrate over time in the clean water pipeline, and deteriorate filtered water quality. That is, the use of the proposed system with the appropriate storage device provides better filtered water quality.

In addition, to implement the proposed water purification system having the proposed storage device, as the automatic valves 11 and 12 of the hydroautomatic unit 7, there are used automatic valves with elastic membranes, in which, between purified filtered water and supplied water, there is an air cavity coupled with the atmosphere, which cavity prevents the ingress of bacteria in filtered water and in the clean water tap in case of possible damage to the membrane. At the same time, controlled chambers of the automatic valves 11 and 12 each has only one input and one output as compared with three inputs/outputs of the controlled chamber in the prototype valve, which reduces the number of connections in the proposed device and enhances its reliability.

The proposed water purification system, in the general case of implementation, performed according to the second embodiment, with use of the proposed storage device performed according to the second embodiment, and also the proposed filtered water storage unit (FIGS. 2A and 2B), operates, in principle, according to the first embodiment, taking into account the following differences.

The water pumping control valve 11 and the drainage control valve 12 have the single common controlling chamber, in which inlet and outlet are connected to the clean water pipeline. When the clean water tap 4 is closed, pressure in the clean water pipeline increases, which cause reaction of the single common controlling chamber of both automatic valves, the water pumping control valve 11 is set into closed position, and drainage control valve 12 is set into open position, resulting in that untreated supplied water flows from the water pumping zone 10 of the water storage unit 6 via the valve 12 and is discharged into the drainage, the pressure of unpurified water applied to walls of the elastic chamber 9 in the storage unit 6 is reduced, and the elastic chamber 9 is filled with purified filtered water. If the clean water tap 4 is open, the pressure in the clean water pipeline drops, the water pumping control valve 11 is opened, and the drainage control valve 12 is closed, resulting in that the supplied water from the water mains enters the pumping zone 10 of the water storage unit 6 via the valve 11, puts pressure on walls of elastic chamber 9, and squeezes out the filtered water into the clean water pipeline.

Depending on the necessity of purified filtered water, the user opens and closes the clean water tap 4, and the above-described processes are repeated.

From the description of the proposed water purification system implemented according to the second embodiment with use of the proposed storage device according to the second embodiment, it follows that, in comparison with the first embodiment, combining two controlling chambers of both automatic valves (the water pumping control valve 11 and the drainage control valve 12) in a single common controlling chamber simplifies the scheme, reduces water connections, and thus reduces risk of external leakage.

At the same time, as in the first embodiment, as the automatic valves 11 and 12 of the hydroautomatic unit 7, there are used automatic valves with elastic membranes, which have controlled chambers each of which has only one input and one output, which reduces the number of connections in the inventive device as compared with the prototype and increases reliability of the inventive device. In this case also, as in the first embodiment, the controlling chamber of the automatic valves 11 and 12 of the hydroautomatic unit 7 is separated from the controlled part by the air cavity coupled with the atmosphere, which makes it impossible to flow water from one cavity to another, thus avoiding, in case of damaged membrane, unpurified water (containing bacteria and viruses) entering purified water for a user.

In addition, in the system implemented according to the second embodiment with the storage device implemented according to the second embodiment, there are completely missing stagnant zones, i.e., places where there is no flow of water, which in operation, leads, as compared with the prototype and the first embodiment, to further improvement of the quality of filtered water.

In particular implementations of the water purification system according to the first and second embodiments, when additionally including the prefilter 13 installed upstream of the reverse osmosis membrane 1, the system operates in the same way, as in the general case of its implementation, with the following differences.

The installed prefilter 13, which includes one or more prefilters for cleaning supplied water from water supply mains, purifies the supplied water from mechanical particles (e.g., sand) and/or chemical compounds (e.g., chlorine) that destroy the reverse osmosis membrane, which improves the quality of water filtration and increases the life of the reverse osmotic membrane 1, i.e., increases the life of the system as a whole.

In particular cases of the water purification system according to the first and second embodiments, when further including the hydraulically controlled shut-off valve 14 installed upstream of the reverse osmosis membrane 1 and connected to the clean water outlet pipe 2, the system operates as in the general case of its implementation, with the following differences.

The installed shut-off hydraulically controlled valve 14, in a case if there is no consumption of filtered water, and the elastic chamber 9 of the water storage unit 6 of the storage device 5 is completely filled with filtered water, terminates the flow of supplied water from the water mains to the reverse osmosis membrane 1, since otherwise untreated water passes through the membrane 1 and drains off to the drainage, i.e., protects the reverse osmosis membrane from excessive use in these cases, increases its service life, improves the quality of water filtration, increases the life of water purification systems, and provides water saving.

In particular cases of implementing the water purification system according to the first and second embodiments, when further including the additional postfilter 15 installed in the clean water line upstream of the tap 4, the system operates as in the general case of its implementation, with the following differences.

The postfilter 15 allows filtered water to be completely prepared for use by a consumer (for example, cut off extraneous odors, saturate the water with certain minerals, etc.), and improves the quality of operation of the water purification system.

In particular cases of implementing the water purification system according to the first and second embodiments, when further including the check valve 16, which is installed in the clean water line upstream of the hydroautomatic unit 7, the system operates as in the general case of its implementation, with the following differences.

Additional installation of the check valve 16 in the water purification system protects the valves 11 and 12 of the hydroautomatic unit 7 from a false triggering, when the pressure drops in the filled elastic chamber 9 of the filtered water storage unit 6 of the storage device 5, which protects the system from excessive consumption of water drained into the drainage, extends the life of reverse osmosis membrane 1, improves the quality of water filtration, and increases the life of the whole system.

In particular cases of implementing the water purification system according to the first and second embodiments, with use of the proposed storage device implemented according to the first and second embodiments, and also the proposed storage unit for filtered water (FIGS. 1A and 1B, FIGS. 2A and 2B), when the body of the elastic chamber 9 of the filtered water storage unit 6 is performed of a modified thermoplastic having biaxially-oriented structure, preferably, in particular, of the group of thermoplastic polyolefin elastomers or thermoplastic styrene elastomers, and also in other particular cases, when the body walls of the elastic chamber 9 of the filtered water storage unit 6 are at least 20% thinner than the walls of chamber neck, or preferably have a thickness of 0.1 mm to 5 mm, most preferably 0.3 mm to 2 mm, the system operates as in the general case of its implementation, with the following differences.

As specified above, the use of the modified polymer with biaxially-oriented structure as material for the body of the elastic chamber 9, which modified polymer, in particular, is preferably selected from the group of thermoplastic polyolefin elastomers or thermoplastic styrene elastomers, obtained in the manufacturing process, results in reduced fragility, increased ductility, increased bending fatigue strength, and consequently improved stability of the elastic chamber 9 of the filtered water storage unit 6 of the storage device 5 to cyclic loads during operation, and also increases barrier properties of the elastic chamber 9, thus reducing the risk of diffusing chemicals from unpurified water.

The use of the elastic chamber 9 of the filtered water storage unit 6 of the storage device 5, which has specified numerical value of the thickness of walls of its body, which are optimal for these purposes, does not affect the operation of the storage device and the water purification system according to the first and second embodiments.

To implement the group of proposed inventions, namely, the filtered water storage unit, the storage device and the water purification system, both as in the general case and in particular embodiments, there can be principally used the known and applicable in the field of water purification materials, elements and units.

For example, as the reverse osmosis membranes 1, there can be used reverse osmosis membrane ULP1812-50 produced by "Vontron".

The outlet pipe 2 for the clean water line and drainage 3 can be performed, for example, of polyethylene tube ¼" (6.35 mm) produced by "John Guest".

As the clean water tap 4, there can be used, for example, the tap F1207A produced by "Dafeng".

In the filtered water storage unit 6, the housing 8 can be performed, for example, of polypropylene BD31 OMO produced by "*Borealis*", and the elastic chamber 9 can be performed of thermoplastic Dryflex 600601 produced by "Nolato Elastotechnic".

As the prefilter 13, there can be used, for example, the replaceable filtering module R1-02 produced by "Aquaphor".

As the shut-off hydraulically operated valve 14, there can be used, for example, the shut-off valve H-V1050B-QC produced by "Applied membranes, Inc.".

As the postfilter 15, there can be used, for example, the replaceable filtering module K1-07 produced by "Aquaphor".

As the check valve 16, there can be used, for example, the check valve ⅜SCV produced by "John Guest".

Figure 4A:
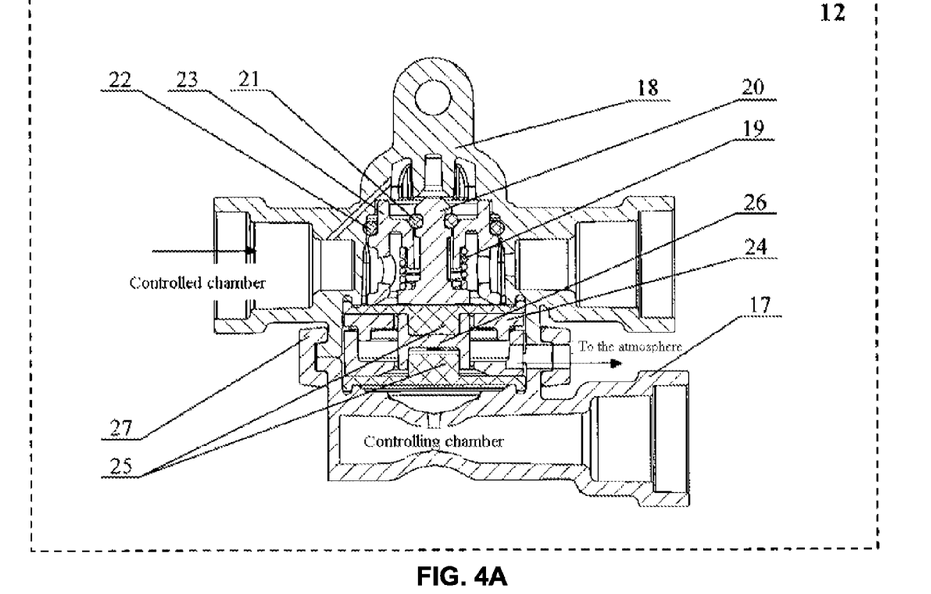
FIGS. 4A and 4B show an example of structural embodiment (first embodiment) with:
 a) drainage automatic control valve (FIG. 4A); and
 b) water pumping automatic control valve (FIG. 4B).
Figure 4B:
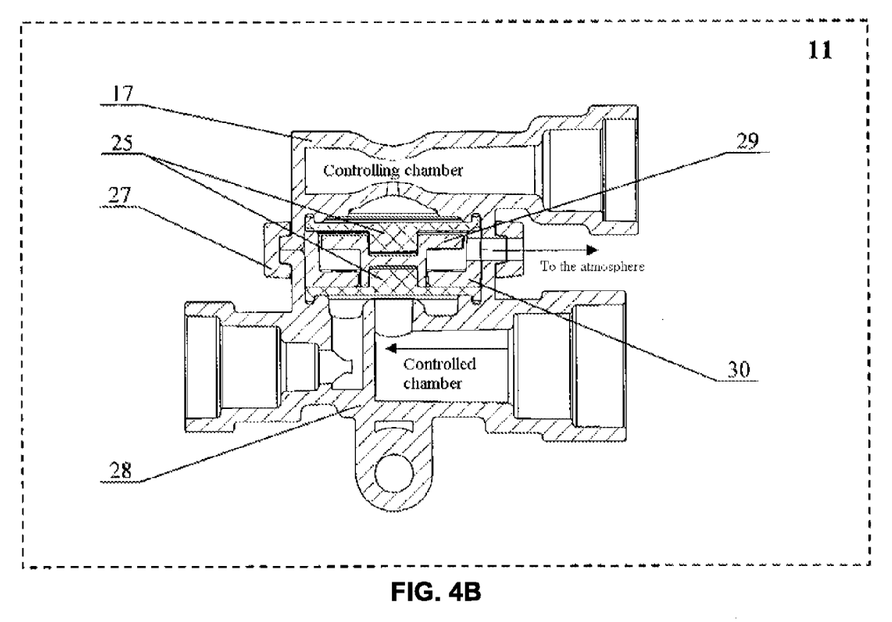

FIGS. 4A and 4B show the example of a constructive implementation of the automatic valves of the hydroautomatic unit 7 used in the first embodiment of the water purification system with the storage device according to the first embodiment:

a) drainage automatic control valve 12 (FIG. 4A); and b) water pumping automatic control valve 11 (FIG. 4B).

These valves are designed by "Aquaphor" on the basis of the known membrane type valves (for example, valve H-V1050B-QC produced by "Applied membranes, Inc."), which basic components are likely performed.

Components in FIGS. 4A and 4B are defined as follows:

17—body;
18—cover;
19—spring;
20—rod;
21—ring;
22—ring;
23—insert;
24—bush;
25—membrane;
26—rod;
27—clamp;
28—cover;
29—rod; and
30—bush.

Figure 5:
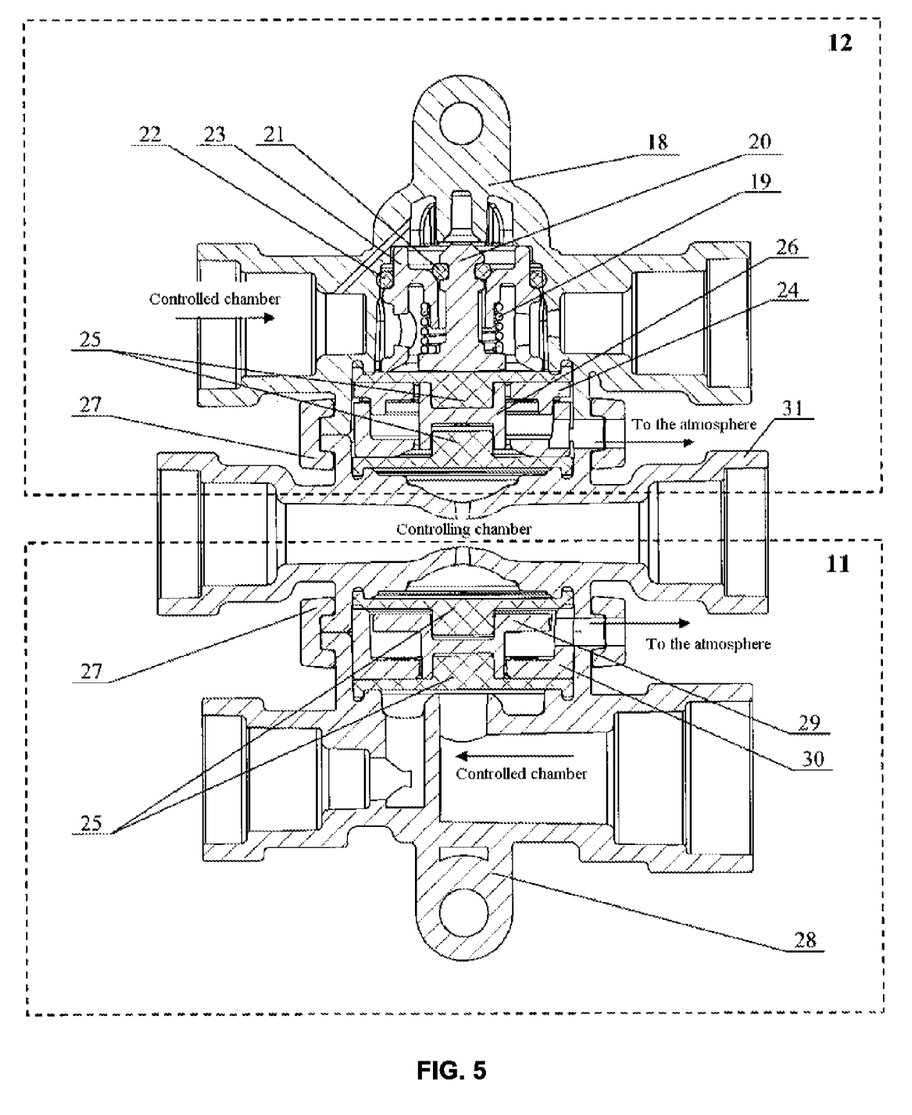
FIG. 5 shows an example of structural embodiment (second embodiment) of automatic control valves for water pumping and drainage control with a common controlling chamber.

FIG. 5 shows the example of constructive implementation of automatic valves of the hydroautomatic unit 7 used in the second embodiment of the water purification system with the storage device according to the second embodiment. These valves (the water pumping control valve 11 and drainage control valve 12) in the present embodiment are constructively combined and have a single controlling chamber, and developed by "Aquaphor" also based on the known membrane-type valves (e.g., valve H-V1050B-QC produced by "Applied membranes, Inc."), which have similar base components.

Components in the FIG. 5 are defined as follows:
18—cover;
19—spring;
20—rod;
21—ring;
22—ring;
23—insert;
24—bush;
25—membrane;
26—rod;
27—clamp;
28—cover;
29—rod;
30—bush; and
31—housing.

Components shown in FIGS. 4A, 4B, and 5 can be performed of engineering plastics by the bulk forming method in thermoplastic injection-molding machines, excepting the following:

Spring 19 can be performed of material resistant to corrosion (e.g., stainless steel) by wire winding;

Rings 21, 22 and membrane 25 may be performed by the bulk forming method of silicone rubber or thermoplastic elastomer.

The invention claimed is:

1. A storage device for a water purification system to supply filtered water in a purified water line dispensed through a tap, said storage device comprising:
a housing in which is disposed a flexible bladder for retaining filtered water and a pumping zone formed between said bladder and said housing; and
a hydroautomatic unit including a pressure-sensitive, normally open pumping valve having a pumping valve controlled chamber and a pumping valve controlling chamber, and a pressure-sensitive, normally closed drainage valve having a drainage valve controlled chamber and a drainage valve controlling chamber, said normally closed drainage valve controlled chamber having an input in flow communication with said pumping zone and an output to drainage, said pumping valve controlling chamber and said drainage valve controlling chamber operating independently and each controlling chamber being in communication with said filtered water in said purified water line,
wherein when said tap is closed, said filtered water in said purified water line flows into said bladder and supply water in said pumping zone flows out through said normally closed drainage valve controlled chamber to drainage, and
wherein when said tap is open, said drainage valve controlled chamber closes and said pumping valve controlled chamber opens permitting supply water to flow though said open pumping valve controlled chamber directly into said pumping zone, thus forcing filtered water in said bladder to flow out to said purified water line and out through said open tap.

2. The storage device of claim 1, wherein said housing is made from a biaxially-oriented thermoplastic elastomer.

3. The storage device of claim 2, wherein said biaxially-oriented thermoplastic elastomer is made from a thermoplastic polyolefin elastomer or a thermoplastic styrene elastomer.

4. The storage device of claim 1, wherein said flexible bladder has a body and a neck, said neck being connected to said housing.

5. The storage device of claim 4, wherein said body has walls and said neck has walls, the walls of said body are at least 20% thinner than the walls of said neck.

6. The storage device of claim 5, wherein thickness of each of the walls of said body is between about 0.1 mm and about 5 mm.

7. A storage device for a water purification system to supply filtered water in a purified water line dispensed through a tap, said storage device comprising:
a housing in which is disposed a flexible bladder for retaining filtered water and a pumping zone formed between said bladder and said housing; and
a hydroautomatic unit including a pressure-sensitive, normally open pumping valve having a pumping valve controlled chamber, normally closed drainage valve having a drainage valve controlled chamber, said normally closed drainage valve controlled chamber having an input in flow communication with said pumping zone and an outlet to drainage, said pumping valve controlled chamber and said drainage valve controlled chamber in communication with a single controlling chamber, said controlling chamber being in connection with said filtered water in said purified water line,
wherein said pumping valve controlled chamber and said drainage valve controlled chamber are connected independently in parallel,
wherein said pumping valve controlled chamber has an input in connection with said supply water and has an output in connection with said pumping zone, and
wherein said drainage valve controlled chamber has an input in connection with said pumping zone and has an output in connection with drainage.

8. The storage device of claim 7, wherein said housing is made from a biaxially-oriented thermoplastic elastomer.

9. The storage device of claim 8, wherein said biaxially-oriented thermoplastic elastomer is made from a thermoplastic polyolefin elastomer or a thermoplastic styrene elastomer.

10. The storage device of claim 7, wherein said flexible bladder has a body and a neck, said neck being connected to said housing.

11. The storage device of claim 10, wherein said body has walls and said neck has walls, the walls of said body are at least 20% thinner than the walls of said neck.

12. The storage device of claim 11, wherein thickness of each of the walls of said body is between about 0.1 mm and about 5 mm.

13. A method of supplying filtered water in a purified water line dispensed through a tap, said method comprising:
when said tap is closed:
passing filtered water from said purified water line into a flexible bladder located inside a housing; and
withdrawing supply water from a pumping zone formed between said flexible bladder and said housing through an input to a controlled zone of a pressure-sensitive open drainage valve, said drainage valve controlled zone having an output to drainage, said drainage valve also having a drainage valve controlling zone; and
when said tap is open:
closing said drainage valve controlled zone to stop withdrawal of supply water from said pumping zone; and
passing supply water from an output of a controlled zone of an open pressure-sensitive pumping valve into said pumping zone, thus forcing filtered water in said bladder to flow out to said purified water line and out through said open tap, said pumping valve also having a pumping valve controlling zone in connection with said filtered water in said purified water line, wherein said pumping valve controlling zone and said drainage valve controlling zone operate independently.

14. The method of claim 13, wherein said housing is made from a biaxially-oriented thermoplastic elastomer.

15. The method of claim 14, wherein said biaxially-oriented thermoplastic elastomer is made from a thermoplastic polyolefin elastomer or a thermoplastic styrene elastomer.

16. The method of claim 13, wherein said flexible bladder has a body and a neck, said neck being connected to said housing.

17. The method of claim 16, wherein said body has walls and said neck has walls, the walls of said body are at least 20% thinner than the walls of said neck.

18. The method of claim 17, wherein thickness of each of the walls of said body is between about 0.1 mm and about 5 mm.

19. A method of supplying filtered water in a purified water line dispensed through a tap, said method comprising:
when said tap is closed:
passing filtered water from said purified water line into a flexible bladder located inside a housing; and
withdrawing supply water from a pumping zone formed between said flexible bladder and said housing through an input to a drainage valve controlled zone of a pressure-sensitive, normally closed drainage valve, said drainage valve controlled zone having an output to drainage; and
when said tap is open:
closing said drainage valve controlled zone to stop withdrawal of supply water from said pumping zone; and
passing supply water from an output of a pumping valve controlled zone of an open pumping valve into said pumping zone, thus forcing filtered water in said bladder to flow out to said purified water line and out through said open tap, wherein a pumping valve controlled chamber of said pumping valve and a drainage valve controlled chamber of said drainage valve are in communication with a single controlling chamber, said controlling chamber being in connection with said filtered water in said purified water line, wherein said pumping valve controlled chamber and said drainage valve controlled chamber are connected independently in parallel, and wherein said pumping valve controlled chamber has an input in connection with said supply water and has an output in connection with said pumping zone, and wherein said drainage valve controlled chamber has an input in connection with said pumping zone and has an output in connection with drainage.

20. The method of claim 19, wherein said housing is made from a biaxially-oriented thermoplastic elastomer.

21. The method of claim 20, wherein said biaxially-oriented thermoplastic elastomer is made from a thermoplastic polyolefin elastomer or a thermoplastic styrene elastomer.

22. The method of claim 19, wherein said flexible bladder has a body and a neck, said neck being connected to said housing.

23. The method of claim 22, wherein said body includes walls and sad necks includes walls, the walls of said body are at least 20% thinner than the walls of said neck.

24. The method of claim 23, wherein thickness of each of the walls of said body is between about 0.1 mm and about 5 mm.

* * * * *